(12) United States Patent
Stein

(10) Patent No.: US 12,099,355 B2
(45) Date of Patent: Sep. 24, 2024

(54) CONTROL DEVICE AND METHOD FOR ASSUMING CONTROL

(71) Applicant: DAIMLER AG, Stuttgart (DE)

(72) Inventor: Fridtjof Stein, Ostfildern (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 533 days.

(21) Appl. No.: 17/431,780

(22) PCT Filed: Feb. 17, 2020

(86) PCT No.: PCT/EP2020/054110
§ 371 (c)(1),
(2) Date: Aug. 18, 2021

(87) PCT Pub. No.: WO2020/169536
PCT Pub. Date: Aug. 27, 2020

(65) Prior Publication Data
US 2022/0137622 A1    May 5, 2022

(30) Foreign Application Priority Data
Feb. 19, 2019 (DE) .................... 10 2019 001 192.9

(51) Int. Cl.
*B60W 50/029* (2012.01)
*G05D 1/00* (2006.01)
*G06F 21/60* (2013.01)

(52) U.S. Cl.
CPC ......... *G05D 1/0055* (2013.01); *G05D 1/0022* (2013.01); *G06F 21/606* (2013.01)

(58) Field of Classification Search
CPC ............. H04L 63/1425; H04L 63/1441; H04L 63/145; H04W 12/121; H04W 12/128;
(Continued)

(56) References Cited

U.S. PATENT DOCUMENTS 5,828,977 A * 10/1998 Hayashi .................. F02D 41/26
                                                    701/115
7,392,541 B2    6/2008 Largman et al.
(Continued)

FOREIGN PATENT DOCUMENTS

CN          1954297 A      4/2007
CN       102438237 A       5/2012
(Continued)

OTHER PUBLICATIONS

Translation of CN105743902A, cited by Applicant (Year: 2016).*
(Continued)

*Primary Examiner* — Kenneth J Malkowski
(74) *Attorney, Agent, or Firm* — PATENT PORTFOLIO BUILDERS PLLC

(57) ABSTRACT

A control device for a vehicle includes a communication module, which establishes a transmission and receiving connection to a server external to the vehicle, and a control module connected to this for driving functions, which receives data of at least one sensor and controls at least one actuator for at least partially autonomously controlling at least one of the driving functions in the vehicle. A disconnector physically separates at least the receiving connection and a read-only memory, in which a piece of software for overwriting the software in the communication module and the control module in case of interference, is stored. Control of the control device is assumed when the control device has presumably been tampered with in the vehicle and uses this to separate at least the receiving connection, to bring the vehicle into a safe traffic state as needed, and to overwrite software in the control module and the communication module with software from the read-only memory.

9 Claims, 3 Drawing Sheets

Figure 1:
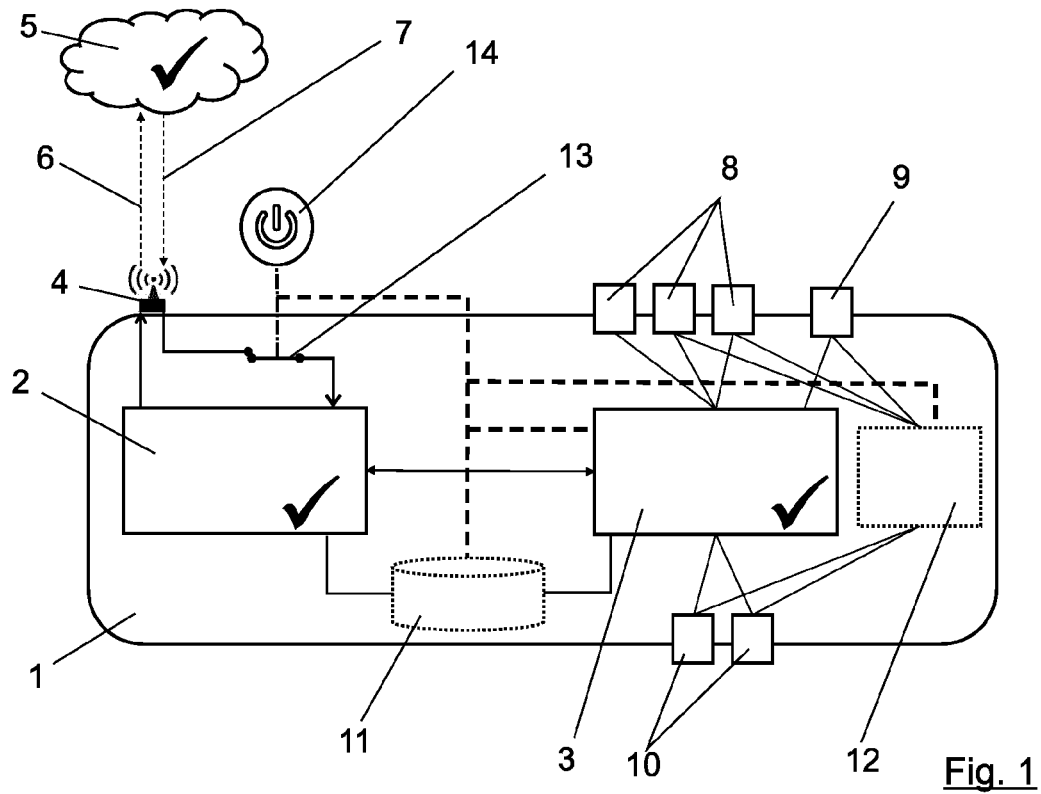

(58) Field of Classification Search
CPC ..... H04W 4/44; G05D 1/0055; G05D 1/0022; G06F 21/606

See application file for complete search history.

(56) References Cited

U.S. PATENT DOCUMENTS

| | | |
|---|---|---|
| 10,027,672 B2 | 7/2018 | Noda et al. |
| 10,073,456 B2 | 9/2018 | Mudalige et al. |
| 10,705,820 B2 | 7/2020 | Madrid et al. |
| 2015/0358329 A1 | 12/2015 | Noda et al. |
| 2018/0255082 A1* | 9/2018 | Ostergaard ............. G06N 20/00 |
| 2019/0215339 A1 | 7/2019 | Chen |

FOREIGN PATENT DOCUMENTS

| | | |
|---|---|---|
| CN | 104395937 A | 3/2015 |
| CN | 105009545 A | 10/2015 |
| CN | 105743902 A | 7/2016 |
| CN | 107272676 A | 10/2017 |
| CN | 108427565 A | 8/2018 |
| CN | 109286614 A | 1/2019 |
| DE | 69602693 T2 | 10/1999 |
| DE | 112014000623 T5 | 11/2015 |
| DE | 102017126877 A1 | 5/2018 |
| DE | 102017220845 A1 | 5/2019 |
| EP | 3370389 A1 | 9/2018 |

OTHER PUBLICATIONS

Office Action created Jan. 31, 2024 in related/corresponding CN Application No. 202080015338.8.

International Search Report mailed Apr. 29, 2020 in related/corresponding International Application No. PCT/EP2020/054110.

Office Action created Oct. 21, 2019 in related/corresponding DE Application No. 10 2019 001 192.9.

Written Opinion mailed Apr. 29, 2020 in related/corresponding International Application No. PCT/EP2020/054110.

Office Action dated Jun. 14, 2024 in related/corresponding CN Application No. 2020800153388.

* cited by examiner

CONTROL DEVICE AND METHOD FOR ASSUMING CONTROL

BACKGROUND AND SUMMARY OF THE INVENTION

Exemplary embodiments of the invention relate to a control device having a control module for controlling at least one actuator for at least partially autonomously controlling at least one driving function of a vehicle, as well as a method for assuming control via a control device of this kind that has presumably been tampered with.

Crosslinked control devices for a vehicle that communicate via communication modules with servers external to the vehicle, so-called backend servers, are known from the prior art. The field will be made use of more and more in the future, be that for navigation systems or for driver assistance systems controlling a manually driving vehicle or a vehicle at least partially under the control of a person using the vehicle. Along with such functionalities, referred to below as partially autonomous driving functions, crosslinked control devices will also be used in the future, in particular for autonomously driving vehicles.

Both with partially autonomous driving functions, yet also in particular with autonomous driving, safety plays a crucial role. The safety of the functionality of individual sensors can be achieved, for example, by redundancies and/or monitoring individual sensors or sensor groups using other sensors or sensor groups. In this context, reference can be made to DE 10 2017 126 877 A1. With the crosslinked vehicles or their control devices, a further aspect now plays a crucial role in terms of safety. The communication between the external server and the communication module of the vehicle is relevant to safety with regard to the driving function. For this reason, the communication systems are encrypted. Thus, on one hand, tamper protection can be ensured and, on the other hand, it can be verified that the communication partners actually provided for this communicate with one another. The encryption thus serves to protect the integrity of the data while protecting the authenticity of transmitter and receiver which use such encryption methods.

Here, typical methods are, at present, asymmetrical public-key methods. The fact is, however, that static safety architecture cannot underlie such approaches because technologies for encrypting and decrypting are constantly being further developed. Safety architecture selected at one point in time would thus become outdated in the near future as a result of the advancement of technology, such that a gateway to the communication between the backend server and the vehicle is open for a hacker, for example. They could thus provide the vehicle with corresponding malware or harmful commands, such that accidents can be provoked, for example, autonomously driving vehicles can be controlled to incorrect destinations, in order to unlawfully run down the charge, or similar. This is a horror scenario both for the vehicle manufacturers and the people using the vehicles. However, to a certain extent there is no stopping this, since encryptions, which currently cannot yet be decrypted despite considerable effort, will possibly be able to be decrypted in the near future, in particular if so-called quantum computers were to come into use, which have a completely new way of doing calculations and which render known approaches to cryptography, which we consider secure today, ineffective. Now of course, the approaches to cryptography will be developed further. However, it must be feared that gaps in the method occur more and more, such that, despite all security technology, hackers procure unwanted access to the communication between the external server and vehicle in order to thus manipulate the vehicle in an unwanted and dangerous manner.

DE 10 2017 126 877 A1 discloses a control system for an autonomous vehicle having at least one controller, which receives first sensor values from a first group of sensors, in order to recognize a first state of a detected object in the vicinity of the vehicle, and second sensor values from a second group of sensors, in order to recognize a second state of the detected object. Based on a comparison of these states, an actuator of the vehicle is automatically controlled, which is set up to control vehicle steering, acceleration, braking, or gear changing.

DE 10 2017 220 845 A1 relates to a control device network having a plurality of control devices for a vehicle for shifting or migrating a function or application or a process from a first control device to a second control device of the control device network. The control device network is designed to identify, in particular as needed, the function or application or process on the first control device for shifting and to select a suitable second control device.

A controller for an engine with controllable overwriting of the controller programs or data after stopping the engine is described in DE 696 02 693 T2.

DE 11 2014 000 623 T5 describes an access limitation device, an on-board communication system, and a method for limiting communication, which are intended to prevent the divulgence of information as a result of an unauthorized access by malware programs to a network internal to the vehicle.

Against this backdrop, exemplary embodiments of the present invention are directed to an improved control device and a method for assuming control via a control device that has presumably been tampered in order to also remain capable of acting in the event of a compromised control system.

The control device according to the invention for a vehicle comprises a communication module having a transmission connection and a receiving connection to a server external to the vehicle and a control module connected to it for driving functions, which receives data of at least one sensor and controls at least one actuator for at least partially autonomously controlling a driving function in the vehicle. This is common in partially or completely autonomously driving vehicles or manually driving vehicles with assistance systems, which are crosslinked. The control device according to the invention now provides a disconnector for physically separating at least the receiving connection and a read-only memory, in which a piece of software for overwriting the software in the communication module and the control module, and optionally further modules of the control device for the vehicle, is contained and saved.

In the case of a recognized or presumed compromised communication, it must be assumed that malware has already found a way into the control device for the vehicle via the communication channel. Now, a person driving or monitoring the vehicle can physically separate at least the receiving connection in order to ensure that no further information, and/or control commands possibly provided with malware reach the control device for the vehicle and/or are performed by it. Using the read-only memory in which a piece of corresponding software is stored in a manner that cannot be changed and is resistant to tampering, the software can be written over a piece of malware in all modules of the control device. Possible malware is thus replaced with an original version of the control software from the read-only memory. Here, this must of course be designed to be resistant to tampering, such that the software contained in it cannot be tampered with. The process must be controlled in such a way that all software in the control module is completely deleted, such that a piece of potential malware is also overwritten. The software is then installed from the read-only memory, and the control device has its original functionality again. Depending on the software version in the read-only memory, some functions, some adjustments undertaken by the user etc. may be lost, yet there is a base functionality of the control device in any case. An updated version in the read-only memory can be implemented on the part of the vehicle, for example in service intervals, by the memory being replaced.

According to a very simple and efficient embodiment of the control device according to the invention, it is provided that the disconnector can be triggered manually. The disconnector can thus be triggered directly mechanically in its simplest variant. It can be a simple switch or button which, in the manner of an emergency switch, interrupts autonomous or partially autonomous driving functionalities, for example, and can be manually actuated easily, efficiently, and quickly by a person in the event of suspected tampering with the control device.

Alternatively, it is of course also possible to activate the disconnector via a remote triggering, for which this can be triggered according to an advantageous development of the invention via at least one further communication connection while bypassing the communication module. Such a further communication connection must be set up to be strictly separate from the communication with the backend server, in order to not be affected by this in the event of malware infiltrating. It can then be used to trigger the disconnector via a remote triggering and to activate the scenario described above. This can be used, in particular, for example with driverless systems, such as driverless buses or driverless heavy goods vehicles, for example when a monitoring system for the driverless vehicles establishes that they are moving on a route on which they actually should not be on, such that it is presumed that the control device is being tampered with.

As already mentioned, it is sufficient, in principle, when the disconnector separates the receiving connection. Comparatively less damage can be caused via the transmission connection. Nevertheless, it can be meaningful to also correspondingly separate the transmission connection, such that, according to an advantageous development of the idea, it is provided that the disconnector is designed in such a way that it additionally separates the transmission connection. Here, this separation can preferably be carried out as a physical separation.

A further very advantageous design of the invention provides that the disconnector additionally separates the connection to coupled user-specific software modules. Such user-specific software modules, which are also referred to as third party modules, can be coupled to the vehicle, in particular connected to the vehicle via a plug connection. Since it cannot be excluded that the assault on the vehicle is carried out via these software modules, or that, during the attack, malware has been stored on one of these software modules, it is accordingly to be ensured that these are also physically separated from the system. This can be carried out either via the disconnector or a further disconnector or, if the vehicle is used by a person or if a person is on board the vehicle, they can also unplug the corresponding modules before the control software is copied into the control module again from the overwritten memory.

In order to be able to overwrite the software in all modules of the control device, it is necessary to temporarily deactivate all driving functions. This typically presupposes a safe traffic state of the vehicle, for example a parked state. In order to be able to achieve this without the danger of potential tampering, which prevents such a state, according to a very advantageous and favorable design of the control device according to the invention, it can be provided that the disconnector is further set up to deactivate the control module and to activate a read-only emergency control module. According to a very advantageous development of the idea, this read-only emergency control module then has access to the few sensors and actuators necessary for its functionality, in order to bring the vehicle into a safe traffic state, in particular a parked state, via the emergency control module in the event of its activation. Thus, the vehicle can be stopped, for example, and driven onto the hard shoulder, while a hazard warning light or similar is activated. As soon as the vehicle has then achieved a safe traffic state, in particular a parked traffic state, loading the potentially infected software of all modules of the control device is carried out by the software saved in the read-only memory.

The method according to the invention addresses this sequence according to the method, which has indeed already been described above, in detail once again. Independent of the constructive structure of the control device, at least the receiving connection is physically separated, after which it is checked as to whether the vehicle is in a safe traffic state, in particular in a safe parked state. If this is the case, the software in all modules of the control device can be overwritten by the software saved in the read-only memory. If this is not the case, a read-only emergency control module must first be activated, which brings the vehicle into a safe traffic state, in particular parked state, before the software is correspondingly overwritten in the other modules of the control device and thus is replaced with a piece of software not infected with malware.

Here, it is also conceivable, in principle, to leave the transmission channel open, yet this can optionally also be interrupted, as described above.

Further advantageous designs of the control device according to the invention and the method according to the invention moreover emerge from the exemplary embodiments, which are depicted in more detail below while referring to the figures.

BRIEF DESCRIPTION OF THE DRAWING FIGURES

Figure 2:
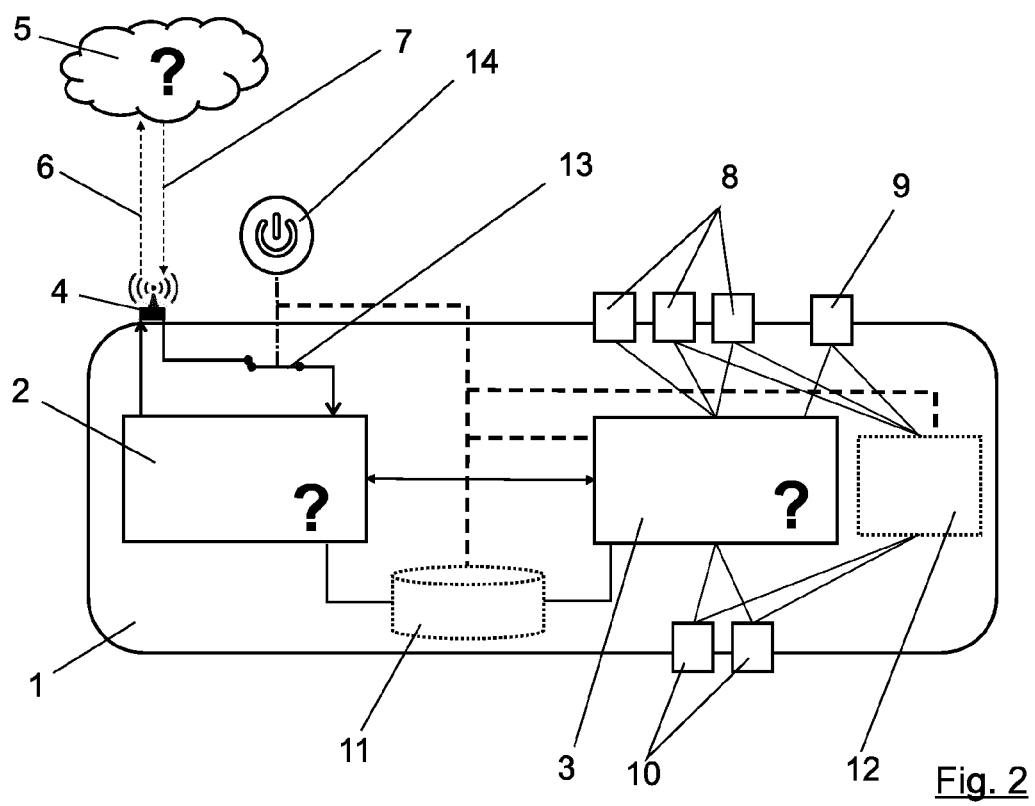
Figure 3:
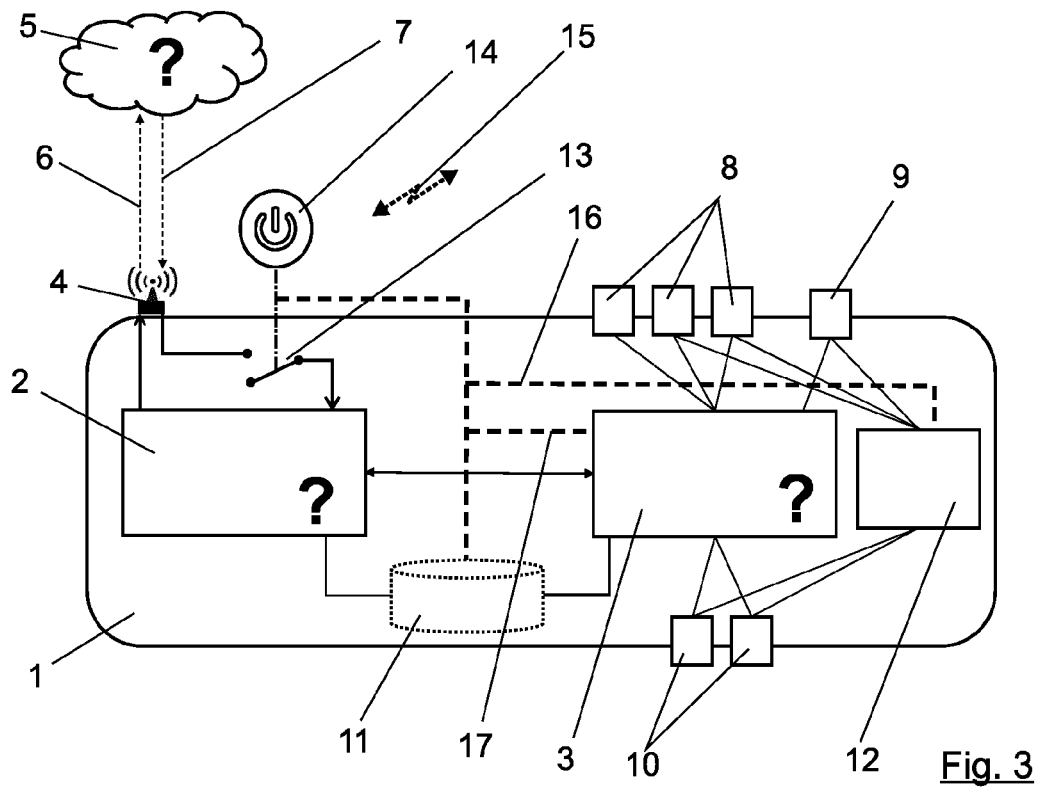
Figure 4:
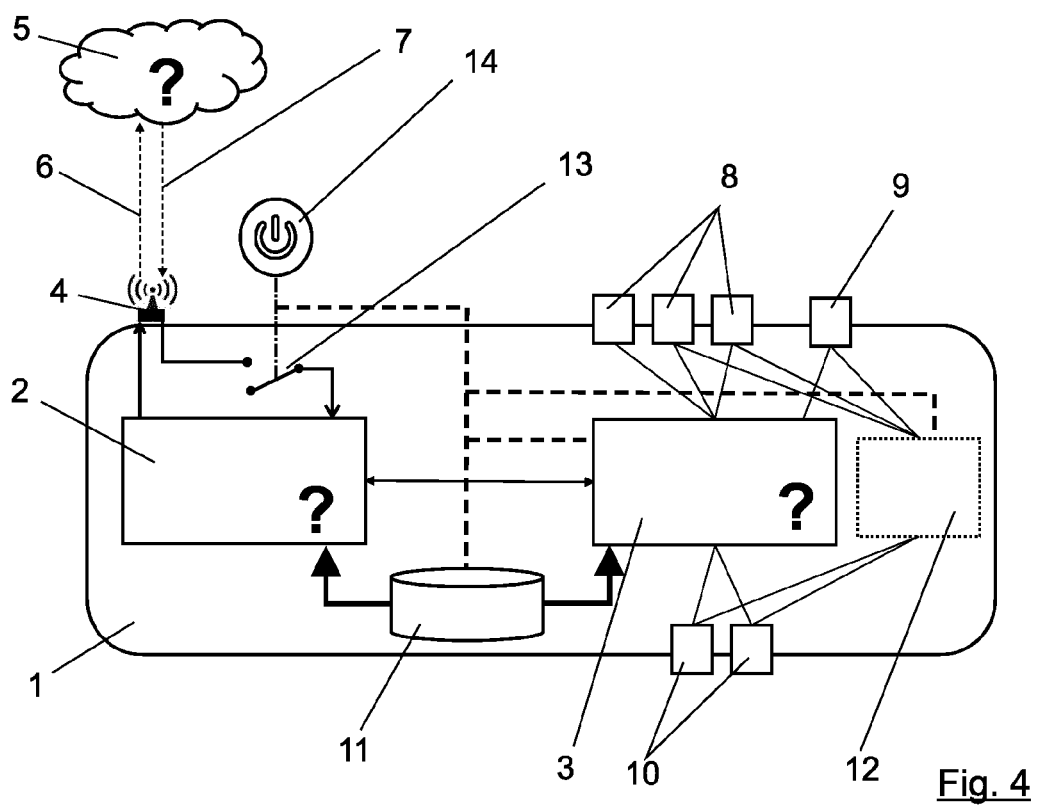
Figure 5:
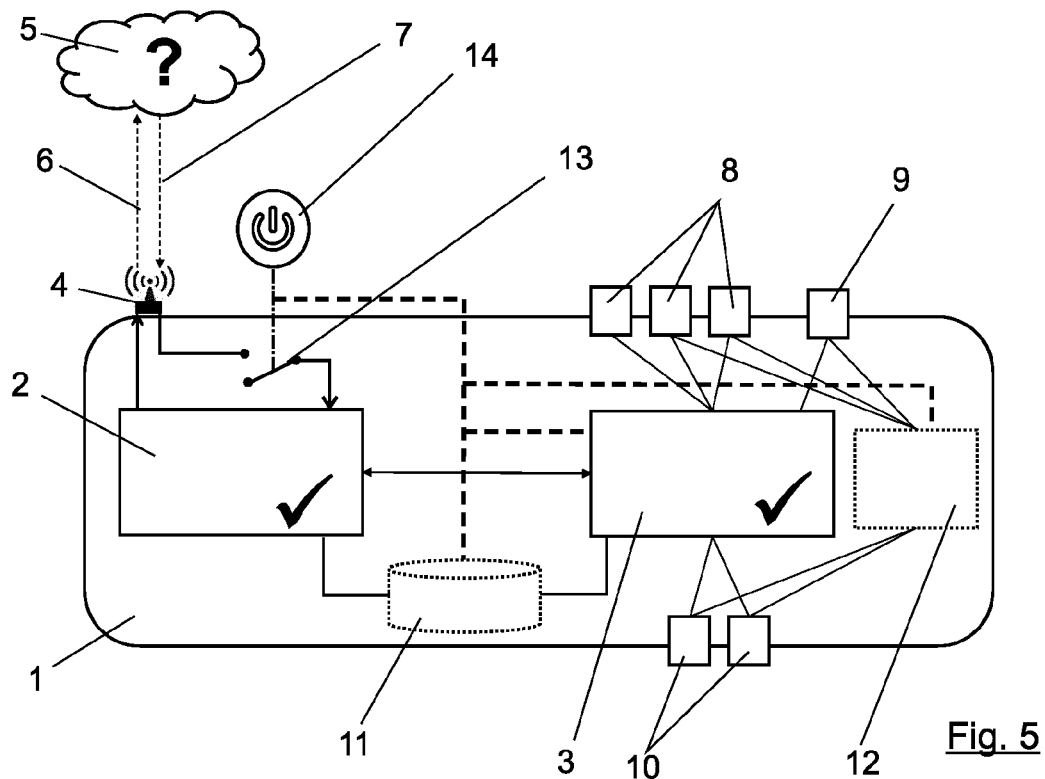
Figure 6:
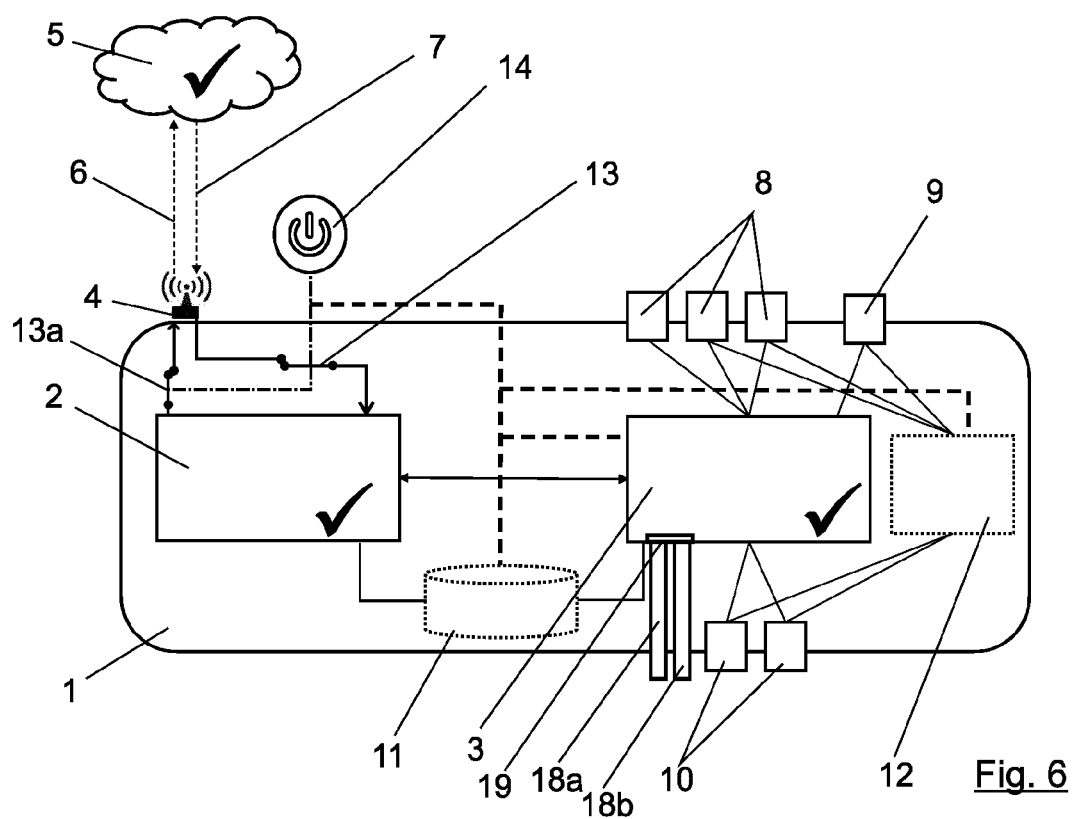

Here are shown:

FIG. 1 a possible structure of a control device according to the invention in a vehicle;

FIG. 2 the control device according to FIG. 1 in a compromised state;

FIG. 3 the control device according to FIG. 1 after activating the disconnector;

FIG. 4 the control device according to FIG. 1 upon re-establishing a safe state;

FIG. 5 the control device according to FIG. 1 after reaching the safe state; and FIG. 6 a possible alternative embodiment of a control device analogous to that in FIG. 1.

DETAILED DESCRIPTION

In the depiction of FIG. 1, a vehicle 1 having a control device is indicated in principle. The control device comprises at least one communication module 2 and a control module 3. The communication module 2 ensures a connection of the crosslinked vehicle 1 via a transmission and receiving device 4 to an external server 5, which is also referred to as the backend server and which is here depicted as a cloud, purely by way of example. Here, the communication module 2 can establish a transmission connection, labelled with 6, and a receiving connection, labelled with 7, between the external server 5 and the communication module 2. The communication module 2 is, moreover, in connection with the control module 3. The control module 3 receives data from the communication module 2 and transfers information to it. The control module 3 is, moreover, coupled to surroundings sensors 8, which are here indicated by way of example. The surroundings sensors 8 can be, for example, optical sensors, radar sensors, Lidar sensors, ultrasound sensors or similar. They serve to implement autonomous driving functions, in order to be able to operate the vehicle 1 partially or completely autonomously. However, they also serve to support driver assistance systems which, in the sense described here, fall under the partially autonomous driving functions.

In addition, purely by way of example, a GPS module, labelled with 9, is indicated as a further sensor and is connected to the control module 3. Moreover, the control module 3 is connected to actuators 10, which are formed to influence the vehicle 1, for example for accelerating, braking, steering, or similar. They can also be correspondingly used for autonomous and for partially autonomous driving, i.e., supporting a person driving the vehicle 1 using driver assistance systems.

Moreover, the control device in the vehicle 1 now has a read-only memory 11, in which the software for the communication module 2 and the control module 3, and optionally further modules present in the control device, is saved. Here, this software is protected from any access and possible tampering in the read-only memory 11. In regular operation, it is not in connection with the modules 2, 3, but rather these have installed their own, ideally the same, software or possibly also an already newer version of the software.

An emergency control module 12, the functionality of which will be discussed in more detail later, is also designed to be tamper-proof and read-only, such that no change of the functionalities of the emergency control module 12 is possible via the software of the modules 2, 3. It is correspondingly connected to at least some of the actuators 10 and some of the sensors 8, yet typically does not require a connection to all sensors 8, 9 for its functionality, which will be described in more detail later, even if this is conceivable in principle.

The functionality of the vehicle 1 and the communication with the backend server 5 here is regular, such that the read-only memory 11 and the emergency control module 12 are currently not necessary. Therefore, they are depicted in a dotted manner since they are not integrated into the procedures of the control device. Both the backend server 5 and the modules 2, 3 are respectively provided with a check mark to symbolize the regular and uncompromised state of the control device 1.

In the depiction of FIG. 2, the same construction is depicted again. The same elements are provided with the same reference numbers, such that there is no need to go into detail about this again. The problem is now that a compromised state of the control device is present or at least there is the danger of it being present. This is accompanied, for example, by a compromised server 5 or communication diverted to an incorrect server 5. In the depiction of FIG. 2, the server 5 and the two modules 2, 3 are therefore symbolically provided with a question mark, which depicts the no longer regular and possibly compromised state thereof.

There is thus the risk of an accident or theft of the vehicle 1, for example, possibly caused by malware, hijacking or similar.

When a person in the vehicle 1 no longer trusts it during an autonomous driving mode of the vehicle 1 because they recognize a hijacking or a driving maneuver that is completely inappropriate for the situation, for example, and are potentially also not in the position to seize control of the vehicle, for example by means of a manual steering intervention, they can assume the control device is being tampered with. Along with such an assumption based on the experience and the observations of a person in the vehicle 1, a request, for example by the vehicle manufacturer to the respective person, is carried out, in particular when the server 5 or the communication between the server 5 and the vehicles 1 of the vehicle manufacturer is compromised and this has been established by the vehicle manufacturer, for example. Then, a request for reaction can also be made to a person using the vehicle 1 or located in the vehicle 1. This can be carried out, for example, via a radio announcement, via a mobile telephone or via other information channels. The person in the vehicle 1 or, if it is driving completely autonomously, such as a local transport bus or a heavy goods vehicle, for example, also an external person involved in the control of the vehicle 1, can now actuate a disconnector 13. In the figures, this disconnector 13 is arranged between the communication module 2 and the server 5 for physically separating the receiving connection 7. It can be triggered mechanically, for example via the indicated button or switch 14, by a person in the vehicle 1. A remote triggering, as is indicated in FIG. 3 by the double arrow 15, can take place, wherein such a remote triggering must run via an individual communication channel in parallel to the communication with the server 5, such that this cannot also be compromised.

In order to be able to correspondingly react, it is now important that the vehicle 1 is in a safe traffic state, in particular in a parked traffic state. If this is the case, reaction can take place directly after opening the disconnector 13. If this is not the case and if, from this, the scenario described here is to be assumed, then the already specified emergency control module 12 is activated by the disconnector 13 via the control line marked with 16 in FIG. 3, while the actual control module 3 is deactivated via the line indicated with 17. The emergency control module 12, which is now depicted in a drawn-through manner since it is active in this situation, now assumes control of the vehicle 1 in so far as a safe traffic state is sought using the emergency control module 12. For example, the vehicle 1 can be decelerated and steered onto the hard shoulder, at the same time a hazard warning light can also be activated or similar.

If the vehicle 1 has reached its safe traffic state, for example a safe parked position, the emergency control module 12 is deactivated again, as is indicated in the depiction of FIG. 4. The still questionably compromised software in the modules 2 and 3 of the control device can comprise any malware at any point. In order to now render this malware harmless, the entire software of the modules 2, 3, and optionally further modules and/or transmission controls between the sensors 8, 9 and the module 3 or the actuators 10 and the module 3, is overwritten. For this, the software is unchanged in the now active read-only memory 11 and thus contained in a non-tampered or compromised manner. The software is now reinstalled on the modules 2, 3 and optionally further modules of the control device in the vehicle 1, while the physical separation of the receiving channel 7 via the disconnector 13 is further maintained.

After reinstalling the software, the state symbolized in FIG. 5 is reached. The read-only memory 11 is deactivated again, the modules 2 and 3 are again provided with the newly installed software and are once again safely capable of functioning, as is indicated by the tick. The disconnector 13 remains open since the state of the external server 5 is furthermore questionable and cannot be clarified from the vehicle 1. However, the driving functions of the vehicle 1 are now reproduced. If the driving functions of the vehicle 1 are reproduced in an otherwise autonomously driving vehicle 1, the vehicle 1 can be moved again in principle. If this is not possible without connection to the server 5 in the autonomous driving mode, then there is the possibility of using pedlary not necessary in principle in the vehicle 1 and/or a steering wheel or a different control device such as a steering lever in the manner of a joystick. These elements for controlling the vehicle 1 can be carried along in a service region of the trunk or similar, comparable to a spare wheel, in the vehicle 1. When the vehicle 1 has come to a standstill and the software has been overwritten by the software from the read-only memory 11, then these control accessories, for example a joystick or a steering wheel, and/or pedlary, can be coupled to the vehicle 1 or the control module 3 mechanically, in a cable-bound manner and/or a cable-free manner. The vehicle 1 can then be moved manually, for example in order to control the vehicle 1 into a workshop. However, the person who used the vehicle is not to reproduce the communication connection to the server 5 by closing the disconnector 13, since it is not clear to this person or the control device in the vehicle 1 as to what extent the server 5 is being further tampered with. The communication connection between the communication module 2 and the external server 5 can thus only be re-established in a specialist workshop, such that it is ensured that at last the receiver connection 7 is only re-established when it is also possible safely and without further harm.

The software in the read-only memory 11 and in the emergency control module 12, which is saved in a read-only manner comparable that in the read-only memory 11 and tamper-resistant in the control device, can also not be changed by a person using the vehicle 1, but rather only by the corresponding memory chip being exchanged with a memory chip with a newer version of the software, for example in a service interval in a workshop. An update can thus only be manually carried out in the workshop and an update, for example, of the other modules 2, 3 cannot be initiated by the backend server 5 in order to not create a gap in the security system.

As already mentioned several times, along with the separation of the receiving connection 7, the transmission connection 6 can also be separated. In the depiction of FIG. 6, this is schematically indicated analogously to the depiction in the preceding figures. The disconnector 13 here comprises a second part, labelled with 13a, which is triggered and switched together with the disconnector 13 and which physically separates the transmission connection 6 analogously to the receiving connection 7. Otherwise, the construction shown in FIG. 6 corresponds to the designs described above.

Furthermore, it is such that, in the depiction of FIG. 6, two additional user-specific software modules 18a, 18b coupled to the control module 3 are indicated. These can be connected to the control module 3, for example at a plugging place labelled with 19. They contain user-specific software and are also referred to as third party modules 18a, 18b.

Since it cannot be excluded that the tampering with the vehicle 1 originates in one of these software modules 18a, 18b or that malware in the control module 2 has already been established in one or more of the software modules 18a, 18b, before overwriting the software in the control module 3 and the communication module 2, care must be taken that these software modules 18a, 18b are also correspondingly separated from the control module 3. In principle, this can also be carried out via the disconnector 13 or a further disconnector not depicted here, which is correspondingly triggered by the disconnector 13. However, it can also occur that the software modules 18a, 18b are mechanically decoupled by them being unplugged from the interface 19. This can be triggered, for example, by a request to a person using the vehicle 1. Much like the connection construction to the server 5, a renewed implementation or plugging in or connection of the software modules 18a, 18b to the control module 3 should also only take place via a specialist workshop when it is ensured that the software modules 18a, 18b are not compromised or tampered with.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A control device for a vehicle, the control device comprising:
   a communication module configured to establish a transmission and receiving connection to a server external to the vehicle;
   a control module, connected to the communication module, configured to control driving functions, wherein the control module is configured to receive data of at least one sensor and configured to control at least one actuator for at least partially autonomously controlling at least one of the driving functions in the vehicle;
   a disconnector configured to physically separate at least the receiving connection; and
   a read-only memory, which stores a piece of software for overwriting software in the communication module and software in the control module in case the control device is presumed to have been tampered with,
   wherein the control device is configured to
      determine that the control device is presumed to have been tampered with and physically separate at least the receiving connection;
      check, after physically separating at least the receiving connection, that the vehicle is in a parked state;
      after determining that the control device is presumed to be tampered with and after checking that the vehicle is in a parked state, deactivate the control module and activate a read-only control module to bring the vehicle into the parked state, and overwrite software in the control module and in the communication module by saved software from the read-only memory.

2. The control device of claim 1, wherein the disconnector also separates the transmission connection.

3. The control device of claim 1, further comprising: an additional disconnector configured to separate a connection to user-specific software modules coupled to the control module or to the communication module.

4. The control device of claim 1, wherein the disconnector is configured to deactivate the control module and to activate a read-only emergency control module.

5. The control device of claim 4, wherein the read-only emergency control module is connected to the at least one sensor and the at least one actuator, which are necessary for bringing the vehicle into a safe traffic state.

6. A method for assuming control of a vehicle via a control device that is presumed to have been tampered with, the control device having a communication module, which establishes a transmission and receiving connection to a server external to the vehicle, and a control module connected to the communication module to control driving functions, wherein the control module which receives data of at least one sensor and controls at least one actuator for at least partially autonomously controlling at least one of the driving functions in the vehicle, the method comprising:
   determining that the control device is presumed to have been tampered with and physically separating at least the receiving connection;
   checking, after physically separating at least the receiving connection, that the vehicle is in a parked state;
   after determining that the control device is presumed to be tampered with and after checking that the vehicle is in a parked state, deactivating the control module and activating a read-only emergency control module to bring the vehicle into the parked state, and overwriting software in the control module and in the communication module by saved software from a read-only memory.

7. The method of claim 6, further comprising: physically separating connections between user-specific software modules of the vehicle and the control device.

8. The method of claim 6, wherein the transmission connection is physically separated.

9. A method for assuming control of a vehicle via a control device that is presumed to have been tampered with, the control device having a communication module, which establishes a transmission and receiving connection to a server external to the vehicle, and a control module connected to the communication module to control driving functions, wherein the control module which receives data of at least one sensor and controls at least one actuator for at least partially autonomously controlling at least one of the driving functions in the vehicle, the method comprising:
   receiving, via a further communication connection that is separate from the transmission and receiving connections, a remote trigger and physically separating, using a disconnector, at least the receiving connection;
   checking, after physically separating at least the receiving connection, that the vehicle is in a parked state;
   after determining that the control device is presumed to be tampered with and after checking that the vehicle is in a parked state, deactivating the control module and activating a read-only emergency control module to bring the vehicle into the parked state, and overwriting software in the control module and in the communication module by saved software from a read-only memory.

* * * * *